(12) United States Patent
Gill et al.

(10) Patent No.: US 7,252,500 B2
(45) Date of Patent: Aug. 7, 2007

(54) CHECK VALVE ASSEMBLY FOR INJECTION MOLDING APPARATUS

(76) Inventors: Joseph R Gill, 3410 Perry Dr., NW., Canton, OH (US) 44708; Daniel W Shelter, 6180 Chesham Dr. NE., North Canton, OH (US) 44721

(*) Notice: Subject to any disclaimer, the term of this patent is extended or adjusted under 35 U.S.C. 154(b) by 288 days.

(21) Appl. No.: 11/125,689

(22) Filed: May 10, 2005

(65) Prior Publication Data

US 2005/0214404 A1    Sep. 29, 2005

Related U.S. Application Data

(63) Continuation-in-part of application No. 10/452,421, filed on Jun. 2, 2003, now abandoned, which is a continuation-in-part of application No. 09/943,152, filed on Aug. 30, 2001, now abandoned.

(51) Int. Cl.
    *B29C 45/52*    (2006.01)

(52) U.S. Cl. .................................. 425/559; 425/563

(58) Field of Classification Search ................ 425/559, 425/562, 563, 564; 251/368; 137/375, 533.17
See application file for complete search history.

(56) References Cited

U.S. PATENT DOCUMENTS

| | | | |
|---|---|---|---|
| 3,209,408 A | 10/1965 | Kelly | 366/78 |
| 3,698,694 A | 10/1972 | Zeug et al. | 366/78 |
| 3,936,038 A | 2/1976 | Olmsted | 366/77 |
| 4,105,147 A | 8/1978 | Stubbe | 425/562 |
| 4,106,113 A | 8/1978 | Laimer et al. | 366/79 |
| 4,472,058 A | 9/1984 | Pirro | 366/78 |
| 4,530,605 A | 7/1985 | Eichlseder et al. | 425/564 |
| 4,857,486 A | 8/1989 | Ebata et al. | 501/21 |
| 4,862,907 A | 9/1989 | Ledtje et al. | 137/533.11 |
| 4,909,724 A | 3/1990 | Sonoda et al. | 425/562 |
| 4,988,281 A | 1/1991 | Heathe et al. | 425/559 |
| 5,167,971 A | 12/1992 | Gill et al. | 425/559 |
| 6,113,380 A * | 9/2000 | Hara | 425/559 |
| 6,533,567 B2 * | 3/2003 | Suganuma et al. | 425/559 |

* cited by examiner

*Primary Examiner*—Tim Heitbrink
(74) *Attorney, Agent, or Firm*—Paul E Milliken; Ray L Weber

(57) ABSTRACT

An injection molding apparatus which includes a check valve assembly mounted at the forward end of a feed-screw, the valve assembly having forward and rearward valve seat surfaces which co-act in a first position to allow a plasticized polymeric material to enter and flow through the valve into an injection chamber and which co-act in a second position to stop any additional material from entering the valve assembly. The second valve position is effected by a feed-screw injection stroke which generates a back pressure to close the valve, the back pressure moving a check ring of the valve assembly into a position to block entry into the valve. Part of the valve seat surfaces are covered with a plurality of ceramic disks and other valve seat surfaces are covered with a metal alloy which effectively increases the abrasion resistance of the valve seat surfaces and thus also increases the wear service life of the check valve assembly. Other wear surfaces of the valve assembly may also be coated for abrasion resistance.

28 Claims, 5 Drawing Sheets

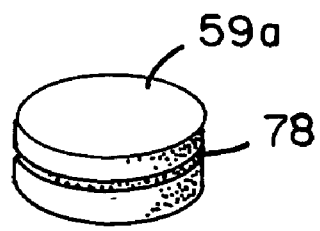
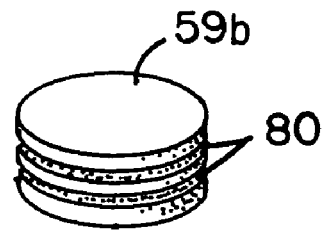
FIG. 6    FIG. 7
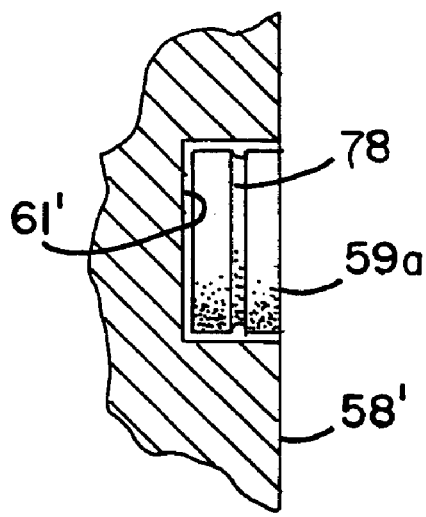
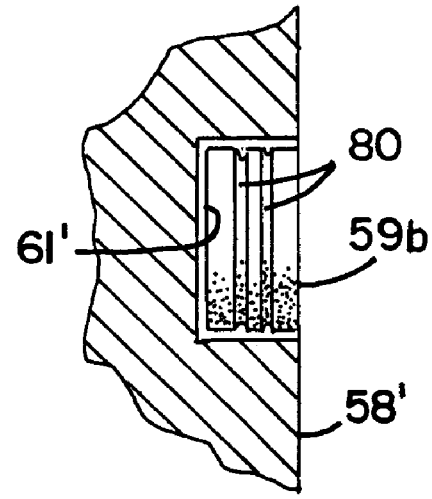
FIG. 8    FIG. 9

CHECK VALVE ASSEMBLY FOR INJECTION MOLDING APPARATUS

RELATED US APPLICATIONS

This is a continuation-in-part of Ser. No. 10/452,421, filed Jun. 2, 2003, Pub No. U.S. 2003/0211198 A1, Pub Date Nov. 13, 2003, now abandoned which is a continuation-in-part of Ser. No. 09/943,152, filed Aug. 30, 2001, now abandoned.

FIELD OF THE INVENTION

This invention relates generally to the art of injection molding apparatus and, more particularly, to an improvement in injection molding apparatus check valve assemblies as applied to restrict back-flow of a plasticized polymeric material during an injection stroke of the apparatus. The specific improvement comprises adhesively attaching abrasion-resistant disks within recesses extending into friction wear surfaces of an injection molding check valve. surfaces.

BACKGROUND OF THE INVENTION

Injection molding of plasticized polymeric materials including plastic and/or elastomeric type materials has been known and practiced for a long time. These type of apparatus are conventionally associated with various molding machines which are adapted for receiving the plasticized polymer and forming it into many useful parts and/or products.

Injection molding apparatus of the type alluded to are generally comprised of a feed-screw or auger member rotatably carried within a substantially cylindrical barrel, the screw effectively moving and plasticizing the polymeric material throughout the length of the barrel towards an exit end where it is forcefully injected into a molding machine for forming and curing of the material into the desired end product. At an exit end of the feed-screw there is conventionally mounted a check valve assembly which is designed to meter out the proper amount of plasticized material by a pressure reactive motion of the valve to effectively shut off the supply of material and to thereafter force the desired volume of plasticized polymer out of an exit nozzle and into the mold cavity of the molding machine.

Many improvements in this art have been suggested and applied to the injection molding apparatus and these, to an improved configuration of the feed-screw member and/or to the check valve assembly to gain greater efficiency in the injection operation by shortening the injection cycle period. Obviously, a shorter cycle period of the injection molding apparatus will also result in an increase in the number of parts which may be produced inasmuch as the molding machines associated therewith may also be configured to accept and form more individual parts.

These improvements in the injection molding apparatus have fairly coincided with advances in the polymer science and technology which has provided improved material chemistry. The improvements, however, have not been without problems as there is now a noticeable increase in wear of the various member elements which comprise the injection molding apparatus. For example, it has been determined that no natural lubricants are available in many of the polymeric materials and this lack of lubrication increases the friction and therefore also the heat generated in plasticizing and injecting the material. Furthermore, it is not possible to add a lubricating material to the process as these tend to contaminate the polymer and this affects the quality of the finished molded product.

In view of the above, friction wear of critical working elements of the injection molding apparatus is a major and continuing problem in the industry as these must be replaced at regular and, in some instances, very short intervals.

It is, of course, generally well-known and recognized by those knowledgeable in this art that the various working elements of the injection molding apparatus are comprised of very expensive tool and/or alloy steels, and this, because of the exceptional wear that these elements experience in this type of process. Thus, the very short service lifetimes of these elements will naturally also effect an increase in the cost of the molded parts being produced.

The following prior art patents fairly represent what has been done in attempts to improve the injection molding apparatus: U.S. Pat. Nos. 3,698,694; 4,106,113; 4,105,147; 4,472,058; and 4,988,281. Further, U.S. Pat. No. 3,209,408 addresses the friction wear problem by providing a ball-bearing configured check valve assembly. Such type ball-bearing configurations-are also evident in some of the above-listed prior art patents. In addition, U.S. Pat. No. 4,530,605 attempts to alleviate part of this problem by providing a rapid take-down configuration for a check valve assembly such that when worn parts need to be replaced this may be done quickly and efficiently with the least amount of down-time. From this it should be apparent that the friction wear problem of critical elements of an injection molding apparatus still exists and this, irrespective of the various advances in the art.

Our prior U.S. Pat. No. 5,167,971 helped to solve the problem by reducing the amount of wear on the various wear surfaces of the valve assembly, and in our prior application Ser. No. 09/943,152, abrasion resistant ceramic layers were adhesively attached to the wear surfaces, however further modifications were found to be needed to deal with the differential in expansion and contraction between the ceramic layers and the metal in order to achieve better adhesion between the ceramic and metal.

Better adhesion of the ceramic material to the metal has been achieved by this present invention by providing a plurality of ceramic disks substantially covering the wear surfaces of the valve assembly to provide improved abrasion-resistance and which are of a size that is not significantly affected by the differences in coefficient of expansion and contraction of the ceramic and metal materials. An improved adhesion of the ceramic material to the metal wear surfaces is also accomplished by attaching the ceramic disks within cylindrical recesses extending into the wear surfaces. This provides greater surface contact between the disks and the wear surfaces.

It has also been found that the adhesion of the ceramic disks within the recesses has been greatly increased by providing notched portions or annular grooves extending around the circumference of the disks and providing and interlocking effect between the grooves and the adhesive flowing into the grooves and curing therein to form radially inwardly extending ribs when cured.

It is, therefore, in accordance with a primary aspect of the present invention an object to provide an improved check valve assembly for an injection molding apparatus wherein the service lifetimes of the various working elements is increased such that many more molded products may be produced before it becomes necessary to replace the working elements of the apparatus.

In accordance with another aspect of the invention it is an object to provide an improved injection molding apparatus check valve assembly which may be made from less expensive base metal and/or tool steel than now applied for these type elements while also providing an operational service life which is greatly for extended over what is available with presently made check valve assemblies.

An even further object of this invention is to provide a plurality of ceramic abrasion-resistant layer ceramic disks substantially covering the wear surfaces which disks may be adhered to the metal wear surfaces without the use of heat being applied to the metal surfaces which might affect the base metal hardness.

Another object of the invention is to provide a plurality of abrasion-resistant ceramic disks having lower frictional heat due to density of the disks.

An even further object of the invention is to provide a plurality of abrasion-resistant ceramic disks which may be adhesively attached to any hardness of metal.

Another object of the invention is to provide a plurality of abrasion-resistant ceramic disks which may be adhesively attached to stainless steel and corrosion resistant high nickel alloys.

SUMMARY OF THE INVENTION

This invention is a check valve assembly for an injection molding apparatus having a rotatable and axially translatable feed-screw within a barrel bore and adapted for moving a polymeric material through the valve assembly towards an exit chamber of the apparatus, the check valve assembly characterized by: a valve body member attached to the forward end of the feed-screw and moveable with the feed-screw, said body member having at least one valve seat surface thereon, an axially slidable member mounted on the body member for limited axial movement thereon, said slidable member having; at least one valve seat surface which frictionally engages a corresponding valve seat surface on the body member, and a circumferential surface at its outside diameter which frictionally engages the inner surface of the barrel bore, the improvement comprising a plurality of cylindrical recesses extending into at least part of the valve seat wear surfaces, said recesses being filled with abrasion-resistant ceramic disks securely attached therein, said disks effectively reducing frictional wear between coacting frictionally engaging surfaces and between the surfaces and the plasticized material as it is moved through the check valve assembly.

BRIEF DESCRIPTION OF THE DRAWINGS

These an other advantages and features of the invention will hereafter appear for purposes of illustration, but not of limitation, in the accompanying drawings, in which like-reference numerals are used to identify like elements and wherein:

FIG. 6 is an enlarged perspective view of an abrasion resistant ceramic disk having an annular groove extending around its periphery;

FIG. 7 is an enlarged perspective view similar to FIG. but having two annular rings extending around the periphery of an abrasion resistant ceramic disk;

FIG. 8 is an enlarged fragmentary cross sectional view through a wear surface of the injection molding apparatus shown in FIG. 2, having a ceramic disk similar to that shown in FIG. 6; and FIG. 9 is an enlarged fragmentary cross sectional view through a wear surface of the injection molding apparatus shown in FIG. 2, having a ceramic disk similar to that shown in FIG. 7.

DETAILED DESCRIPTION OF THE INVENTION

Figure 1:
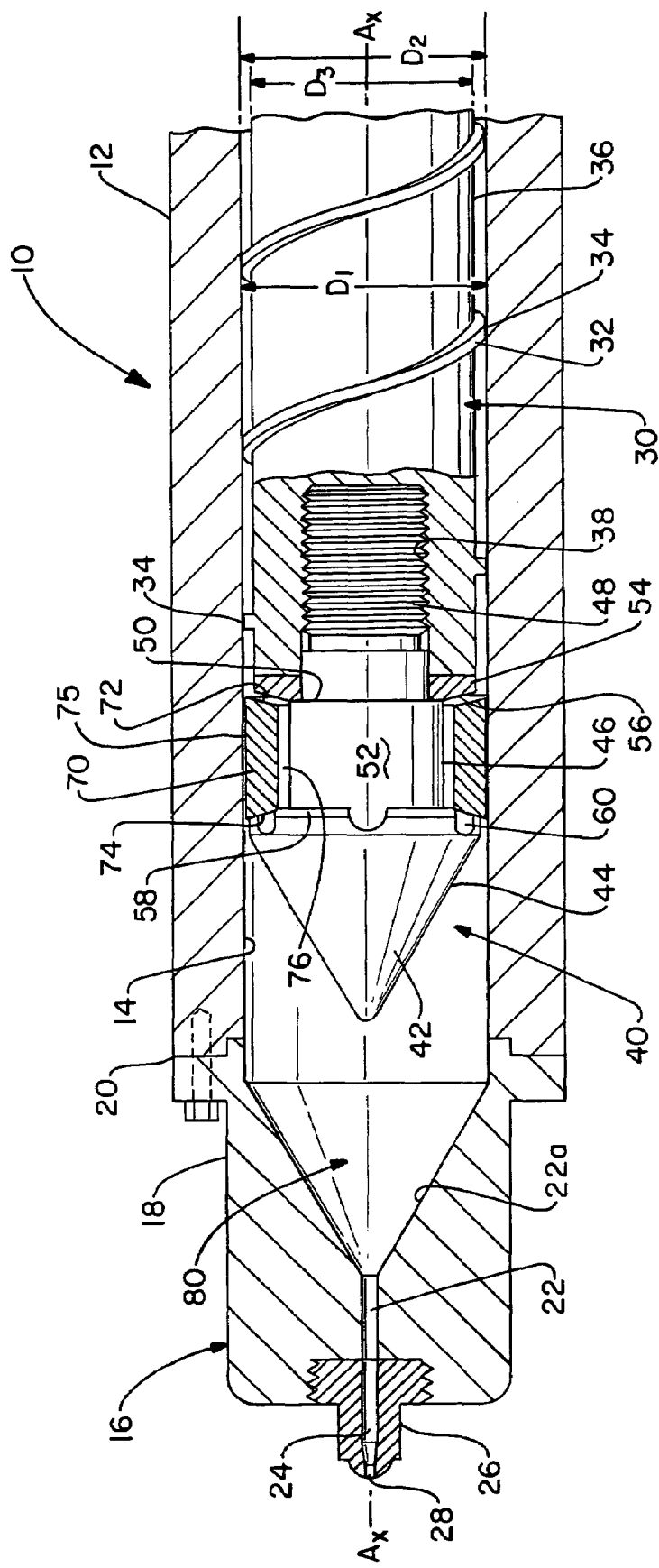
FIG. 1 is a side elevational view, in cross-section and with various parts broken away, illustrating a state-of-the-art injection molding apparatus as may benefit from the concepts taught by the present invention.

In the drawing, FIG. 1 illustrates an injection molding apparatus generally indicated by reference numeral 10. The apparatus 10 conventionally comprises a substantially cylindrical barrel 12 having a specific longitudinal length and it will be recognized that only the exit or output end of the barrel 12 is shown in the drawing. Of course, and as is well-known and understood in this art, an input end (not shown) will include a hopper mechanism for feeding various type of consideration of the present invention. The barrel 12 may be characterized by a bore 14 centered on a longitudinal axis as indicated by the line Ax-Ax in the drawing. The exit end of the barrel 12 is generally indicated by reference numeral 16 and it may comprise an end cap member 18 which is affixed at 20 to the end of the barrel 12 by any of various well-known methods and/or techniques. The end cap 18 is characterized by a through-bore 22, a partial portion of which is conically shaped as at 22a and it connects into an exit bore 24 of a nozzle tip 26. The nozzle tip 26 is adapted for a mating relationship of the injection molding apparatus 10 to a molding machine (not shown) in the well-known and understood manner of such apparatus.

A feed-screw member 30 is mounted co-axially within the bore 14 of the extruder barrel 12 and it is characterized by a helically oriented thread 32 having a land portion 34 exhibiting an outside diameter D1 which is substantially but not exactly equal to the inside diameter D2 of the bore 14. A slight frictional engagement between the two is evident when the feed-screw 30 is rotated within the barrel bore 14. The feed-screw 30 has a body 36 exhibiting an outside diameter D3 which is less than the outside diameter D1 of the thread 32 by a specific amount and it may be appreciated that a rotation of the feed-screw 30 will effect a movement of any material caught between the outside surface of the feed-screw body 36 and the inside surface of the bore 14 toward the exit end 16 of the apparatus 10.

The feed-screw member 30 has an extruder check valve assembly 40 mounted to its forward end and valves of this type may comprise two or more separate but co-operating parts or elements as evidenced in various of the prior art patents. The particular check valve 40 shown in the drawing comprises a valve body 42 characterized by a conically-shaped tip end 44 and a shank end 46 which has a plurality of threads 48 for a portion of its length. The valve body 42 is affixed to the forward end of the feed-screw 30 by way of the shank end 46 being threadably engaged within a threaded bore 38 at the end of the feed-screw 30. The conically-shaped tip end 44 is shaped to mate with the conically-shaped bore 22a such that any material within the forward portion of the barrel bore 14 will be forceably directed into the exit bores 22 and 24 and out of the exit orifice 28 by an axial movement of the feed-screw 30 into the end cap member 18. It is, of course, well-recognized and understood that the feed-screw 30 is connected to a power source (not shown) which controls its rotational and/or axial motion and the particular power means, therefore, is not important to the scope of the present invention.

The shank end 46 of the valve body 42 has a shoulder 50 formed between the smaller diameter threaded portion 48 and a larger diameter valve passage portion 52, the shoulder 50 providing an axial stop for a valve seat ring 54 carried on the smaller diameter portion 48. The valve seat ring 54 has a forwardly-facing valve seat bearing surface 56 and it is further characterized by an outside diameter which is substantially equal to the diameter D3 of the feed-screw body 36. As clearly evident in the drawing, the valve seat ring 54 is maintained in position between the shoulder 50 and the terminal end of the feed-screw 30 when the valve body 42 is threadably engaged within the bore 38 in the end of the feed-screw.

The valve seat ring 54 comprises the rearward valve seat surface 56 of the check valve assembly 40 while a forward valve seat surface 58 is formed on a backside annular surface of the conically-shaped tip end 44. The forward valve seat 58 has a number of axially oriented flute passages 60 passing therethrough and the purpose of these will become apparent as this description proceeds.

The check valve assembly 40 further comprises a check ring member 70 which is mounted about the shank portion 52 of the shank end 46 and it is movable in the axial direction between the rearward valve seat 56 and the forward valve seat 58. The check ring 70 is further characterized by frustoconical valve seat surfaces 72 and 74, the valve seat surface 72 being in a position to sealingly engage the rearward valve seat 56 of the valve seat ring 54 while the valve seat surface 74 is in a position to sealingly engage the forward valve seat surface 58 on the valve body 42. The valve seat surfaces 56, 58, 72, and 74 are obviously mating surfaces and these may be disposed at an angle within the range of 0°-30° with respect to a radially oriented plane which is positioned orthogonally on the Ax axis.

Further with respect to the check ring member 70, it has an outside diameter surface 75, which is substantially but not exactly equal to the inside diameter D2 of the bore 14. While a sealing type engagement is effected as between the check ring 70 and the bore wall 14 such that material moving through the bore may not pass therebetween, the check ring is movable in the axial direction so as to be alternately engageable with either of the forward valve seat surface 58 or the rearward valve seat surface 56. The check ring 70 also has an inside bore diameter which is larger than the outside diameter of the the forward portion 52 of the shank end 46 about which it is mounted. In this configuration, an annular passage indicated at reference numeral 76 is evident and it provides a pass-through for polymeric material when the check valve the check valve assembly 40 is in the "valve-opened" position as shown in the drawing.

In the operation of the injection molding apparatus 10, it will be recognized that a material distribution chamber generally indicated by reference numeral 80 may be established between the tip end 44 of the check valve assembly 40 and the conically-shaped bore 22a of the end cap member 18. When the volume of the distribution chamber 80 is established for a particular molded part, the feeds crew 30 is maintained in its axial position within the barrel bore 14 but it is rotated about the Ax axis. This rotation of the feed-screw 30 effectively moves polymeric material being fed into the barrel 12 longitudinally down the bore 14 towards the exit end 16. The movement of material effectively also moves the check ring 70 into axial engagement with the forward valve seat surface 58 as shown in the drawing. Polymeric material is thus able to move through the check valve assembly 40 by way of the open annular passage 76 and the axial flute passages 60 and then into the distribution chamber 80. As the distribution chamber 80 is filled, an injection stroke of the feed-screw 30 causes the check ring 70 to move into axial engagement with the rearward valve seat surface 56 of the valve seat ring 54. Initiation of this powerful injection stroke of the feedscrew 30 in the axially forward direction forces any material within the chamber 80 out of the exit orifice 28 and into a relatively positioned molding chamber (not shown).

Figure 2:
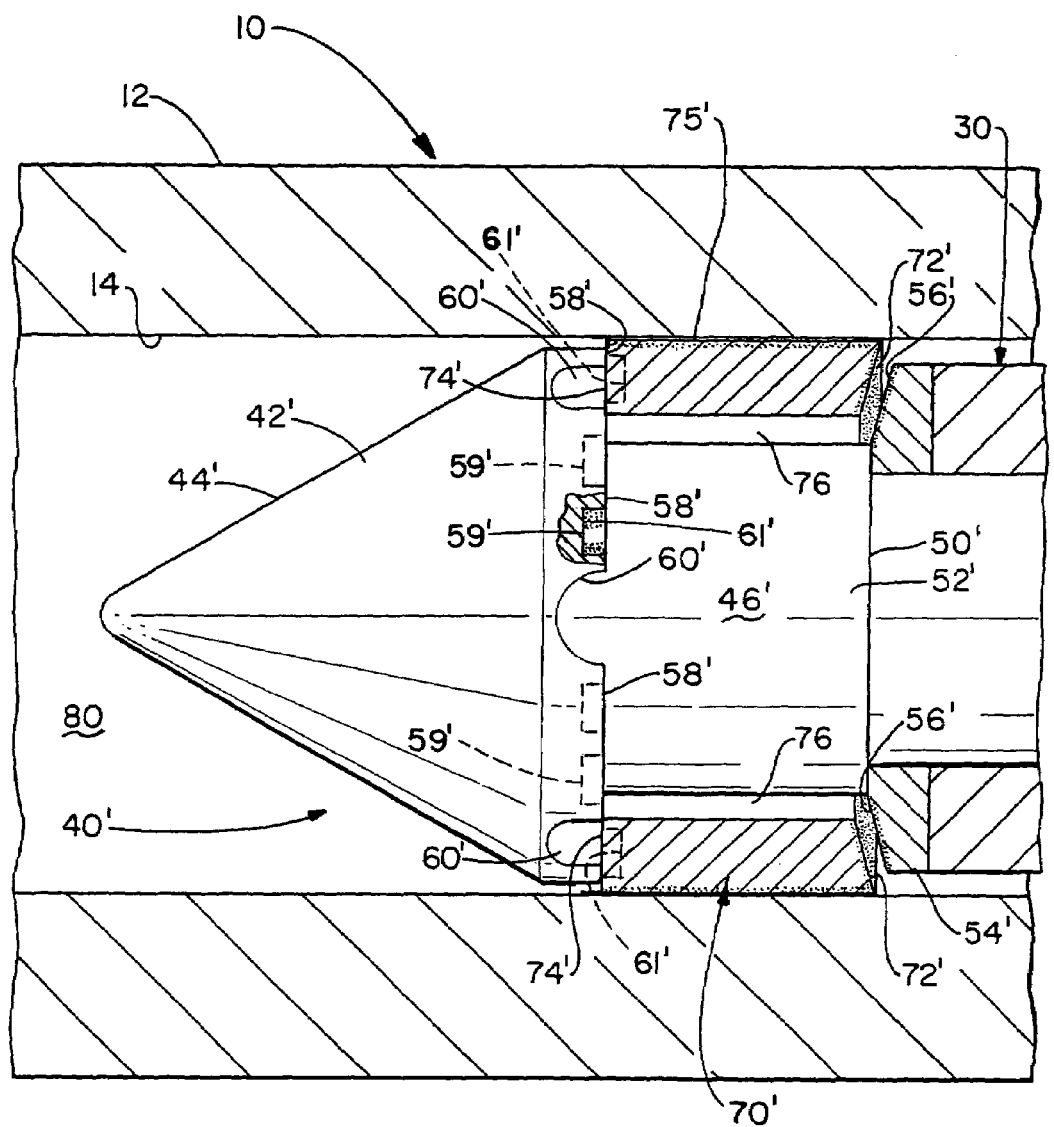
FIG. 2 is a greatly enlarged elevational view, in cross-section, of but a portion of the injection molding apparatus shown in FIG. 1 illustrating the application of the present invention.

From the foregoing description of the injection molding apparatus 10, it must be appreciated that the relative motions as between the various member elements of the apparatus generates heat which also increases the friction component as between the members. This is further aggravated by heat being generated within the polymeric material as it is processed through the apparatus and by a friction component which exists as between the material itself as it passes over the various member element surfaces. It will, of course, be recognized that the operational service life of the various members will be shortened by the amount of wear of critical surfaces and especially the valve seat surfaces of the check valve assembly 40 which actually govern the operation of the injection molding process. Referring now to FIG. 2 of the drawings, a greatly enlarged elevational view of a portion of the apparatus 10 of FIG. 1 is illustrated. In this figure, like-reference numerals are used to designate like elements of FIG. 1 and the primed reference numerals are used to indicate the improved elements of the apparatus in accordance with the concepts of the present invention.

The showing of FIG. 2 is of the forward end of the feed-screw member 30 which carries the check valve assembly 40 in axial position at it forward end. The check valve assembly 40' shown in FIG. 2 is an improved design wherein various of the element surfaces which exhibit exceptional wear and which are critical to the operation of the injection molding apparatus are substantially covered with a plurality of substantially abrasion-resistant ceramic disks 59' securely attached within a plurality of cylindrical recesses 61' in at least the flat annular wear surfaces 58' and 74', which disks, dramatically increases the operational service life of the check valve assembly 40'. When using the disks 59', the flat annular surfaces 58' and 74' are preferable to the frustoconical surfaces 58 and 74 shown in FIG. 1.

Figure 4:
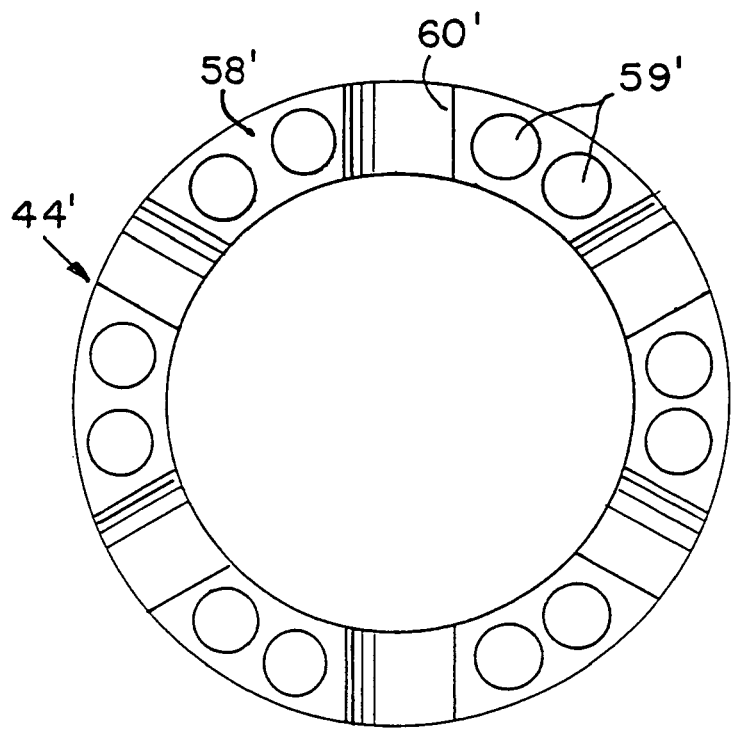
FIG. 4 is a rear end view of a conically shaped tip end of an injection molding apparatus showing a valve seat surface.
Figure 5:
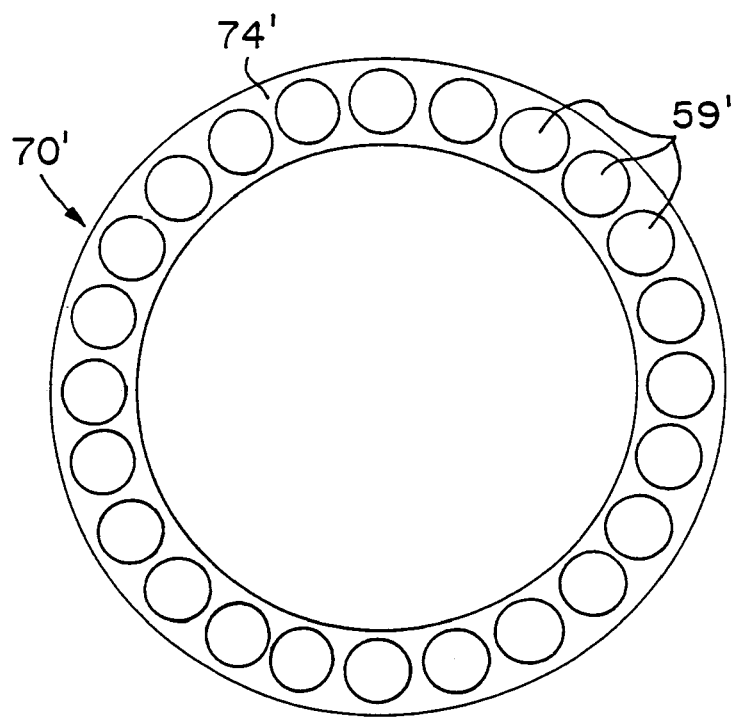
FIG. 5 is a front end view of a check ring of an injection molding apparatus, showing a valve seat surface.

In FIGS. 4 and 5, the disks 59' positioned in the valve seat surfaces 58' and 74' are shown in their relative locations around the valve seats 58' and 74' respectively.

To produce the disks 59', ceramic materials taken from the group comprising the ceramic oxides may be fired to the desired hardness and formed into a plurality of disks 59' of a size to cover a substantial portion of the wear surface and adhesively attached to the wear surface such as shown in FIG. 2 by attaching them in recesses 61'.

After the disks 59 are attached to the selected wear surfaces of the valve parts, the disks and wear surface can then be machined to the desired final gauge thickness so that the outer surface of the disks are flush with the wear surface it is mounted in. For such ceramic disks, a final gage thickness of between ⅛ and ¼ inches, (3.175 and 6.350 mm) is preferable.

One of the preferred ceramic materials which provides an excellent abrasion resistance is a high alumina aluminum oxide. Another ceramic oxide which is also a good choice for abrasion resistance is zirconia and in particular Cerium Oxide Partially Stabilized Tetragonal Zirconia Polycrystal.

The ceramic oxides are considered preferable for use on the forward valve seat surface 58' on the back side of the conically shaped tip end 44.

The ceramic disks 59' described previously, are attached to the wear surfaces of the valve by a high temperature adhesive having the required physical properties to withstand the environment in which it is to used within the valve assembly.

One of the preferred ceramic materials which provides an excellent abrasion resistance is a high alumina aluminum oxide. Another ceramic oxide which is also a good choice for abrasion resistance is zirconia and in particular Cerium Oxide Partially Stabilized Tetragonal Zirconia Polycrystal.

The ceramic oxides are considered preferable for use on the forward valve seat surface 58' on the back side of the conically shaped tip end 44.

With regard to wear surfaces other than 58' and 74', a bonded metallic coating shown in stippled areas is applied to the valve seat ring surface at 56', the check ring valve seat surface 72', and the check ring outside diameter surface 75'.

The bonded coating preferably comprises a metal and/or metal alloy exhibiting a density of at least gm/cm$^3$ at 20°. These may be spray-coated on the desired surface by a technique and/or process know in the metallurgical art as "High Velocity Oxygen Fuel Coating", which is carried out using specific type equipment at over 1927° C.

The bonded coating material is preferably applied to a gage thickness of not more that 0.030 inch, (0.762 mm) after which the surface is machine-ground to a gauge thickness within the range of 0.005-0.025 inches, (0.127-0.635 mm). Preferably after the grinding operation, the coating material exhibits a gauge thickness of at least 0.006 inch, (0.152 mm). Metal and/or metal alloys of the type alluded to are preferably a mixture of tungsten carbide, cobalt and other elements selected from the group of iron, carbon, nickel and chromium.

In addition to metal and/or metal alloy bonded coatings, it will be recognized that various types of ceramic materials may provide the desired abrasion resistance and these may also applied in a manner similar to the valve seat and other frictionally engaging wear surfaces.

This invention, therefore, is not limited to a particular ceramic, metal and/or metal alloy layer but, in the broadest sense covers any high abrasion-resistant material which may be adhesively attached or if carbide coating are used, they are attached to the wear surfaces by spray coating by the High Velocity Oxygen Fuel Coating process.

Finally, it will also be recognized that when such abrasion resistant coatings are used, the underlying base metal may comprise a less expensive metal and/or metal alloy than presently being used for these parts. For example, the very expensive tool and alloy steels presently being used for the valve seat ring 54 and the check ring 70 may be replaced with a number 4150 steel which costs ninety-five percent less. Obviously, a great savings in materials may be realized by the application of the present invention.

Figure 3:
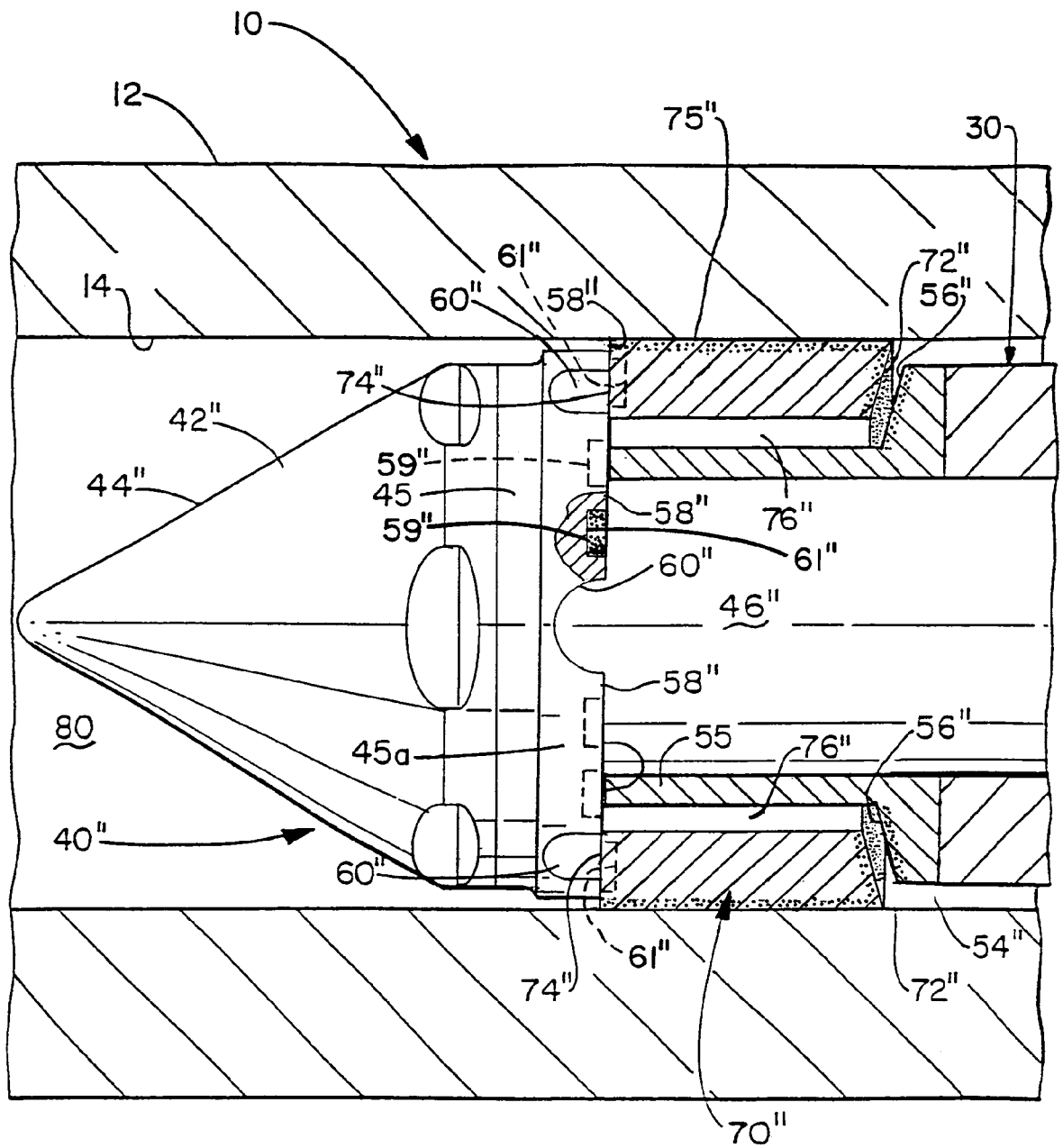
FIG. 3 is a greatly enlarged elevational view, in cross-section similar to FIG. 2 but showing a slightly different modification of the invention.

FIG. 3 shows a different embodiment from that shown in FIG. 2 in which similar parts are shown with a double prime (") instead of a single prime (') as used in FIG. 2. In FIG. 3, the rear end of the conical shaped tip end 44''' is divided into two parts with a bead seat ring 45 positioned against the rear end of the tip end 44''. A valve seat ring 54'' has a forward tubular extension 55 which bears against a rear annular surface 45a on the ring 45 and holds it in position. All the remainder of the wear surfaces 56'', 58'', 72'', 74'' and 75'' are similar to those similar numbers described in FIG. 2. Except for the addition of ring 45 and tubular extension 55, all the rest of the parts of the assembly shown in FIG. 3 are the same as in FIG. 2 and the disk material of ceramic oxide or coating carbide material can be used. It should also be noted that the wear surfaces 58'' and 74'' are flat annular surfaces similar to the surfaces 58' and 74' in FIG. 2.

FIGS. 6-9 show a modified version of the abrasion resistant ceramic discs 59' and 59'' shown in FIGS. 2 and 3. FIG. 6 shows a disk 59a with a single annular groove 78 extending around the periphery of the disk and FIG. 7 shows a disk 59b with a pair of annular grooves 80 extending around the periphery of the disk.

FIG. 8 shows the disk 59a adhesively attached in a recess 61' of a valve seat 58'.

Likewise FIG. 9 shows the disk 59b adhesively attached in a recess 61' of a valve seat 58'. A high temperature adhesive is used to fasten the disks 59a and 59b in the recesses 61. The purpose of the annular grooves 78 and 80 is to provide a space into which the adhesive can flow and provide and interlocking relationship between the adhesive and the periphery of the disk when the adhesive cures and thereby fasten the disks 59a or 59b more securely in the recesses 61.

It will be recognized that various shapes of notches or grooves can be placed in the periphery of the ceramic disks to improve the retention of the disk by the adhesive.

While certain representative embodiments and details have been shown for the purpose of illustrating the invention, it will be apparent to those skilled in this art that various changes and/or modifications may be made therein without departing from the spirit or scope of the invention.

What is claimed is:

1. In a check valve assembly for an injection molding apparatus having a rotatably and axially translatable feedscrew within a barrel bore for moving a plasticized polymeric material through the valve assembly towards an exit chamber of the apparatus, the check valve assembly characterized by;
    (A) a body member having a first forward valve seat surface and a first rearward valve seat surface, and
    (B) an axially slideable valve member movable from a valve-opened position, allowing plasticized material to move through the valve, to a valve-closed position prohibiting any material from entering the valve, the slidable member having,
        (1) a second forward valve seat surface which frictionally engages the first forward valve seat surface
        (2) a second rearward valve seat surface which sealingly and frictionally engages the first rearward valve seat surface, and
        (3) an outside diameter surface which sealingly and frictionally engages the inner surface of the barrel bore
    (C) the valve seats and the outside diameter surface constituting frictional wear surfaces
    (D) the improvement comprising a plurality of cylindrical recesses extending into at least part of the valve seats, said recesses filled with abrasion resistant disks securely attached therein, said disks effectively reducing frictional wear between relatively co-acting frictional wear surfaces and between the surfaces and the plasticized material as it is moved through the check valve assembly.

2. The check valve assembly as claimed in claim 1 wherein the disks are comprised of a ceramic material taken from the group comprising the ceramic oxides.

3. The check valve assembly as claimed in claim 2 wherein the disks are comprised of a high alumina aluminum oxide material.

4. The check valve assembly as claimed in claim 2 wherein the disks are comprised of Zirconia.

5. The check valve assembly as claimed in claim 4 wherein the disks are comprised of Cerium Oxide partially stabilized Tetragonal Zirconia Polycrystal, (Ce-TZP).

6. The check valve assembly as claimed in claim 2 wherein the disks exhibit a final gauge thickness of between ⅛ and ¼ inches, (3.175 and 6.350 mm).

7. The check valve assembly as claimed in claim 2 wherein the disks are attached within the recesses by high temperature adhesive.

8. The check valve assembly as claimed in claim 1 wherein the disks are attached within the recesses in the first forward valve seat and the second forward valve seat.

9. The check valve assembly as claimed in claim 1 wherein the axially slidable member of the check valve comprises an annular ring having second flat annular forward valve seat surface and a second frustoconical rearward valve seat surface which effect a mating engagement with the first forward and rearward valve seat surfaces in the valve opened and valve closed positions respectively.

10. The check valve assembly as claimed in claim 1 wherein at least part of the valve seats of the check valve assembly are covered with an abrasion resistant metal coating fused thereto.

11. The check valve assembly as claimed in claim 1 wherein the outside diameter surface of the axially slidable member and the first rearward valve seat are covered with an abrasion-resistant coating of carbide alloy material.

12. In a check valve assembly for an injection molding apparatus having a rotatable and axially translatable feed-screw within a barrel bore and adapted for moving a polymeric material through the valve assembly towards an an exit chamber of the apparatus, the check valve assembly characterized by:
(A) a valve body member attached to the forward end of the feed-screw and moveable with the feed-screw, said body member having at least one valve seat surface thereon;
(B) an axially slidable valve member mounted on the body member for limited axial movement thereon, said slidable member having;
  (1) at least one valve seat surface which frictionally engages a corresponding valve seat surface on the body member, and
  (2) a circumferential surface at its outside diameter which frictionally engages the inner surface of the barrel bore
(C) the improvement comprising a plurality of cylindrical recesses extending into at least part of the valve seats, said recesses filled with abrasion resistant disks securely attached therein, said disks effectively reducing frictional wear between relatively co-acting frictional wear surfaces and between the surfaces and the plasticized material as it is moved through the check valve assembly.

13. The check valve assembly as claimed in claim 12 wherein the disks are comprised of a ceramic material taken from the group comprising the ceramic oxides.

14. The check valve assembly as claimed in claim 13 wherein the disks are comprised of a high alumina aluminum oxide material.

15. The check valve assembly as claimed in claim 13 wherein the disks are comprised of Zirconia.

16. The check valve assembly as claimed in claim 15 wherein the disks are comprised of Cerium Oxide partially stabilized Tetragonal Zirconia Polycrystal, (Ce-TZP).

17. The check valve assembly as claimed in claim 13 wherein the disks exhibit a final gauge thickness of between ⅛ and ¼ inches.

18. The check valve assembly as claimed in claim 13 wherein the disks are attached in the recesses by epoxy adhesive.

19. The check valve assembly as claimed in claim 12 wherein the axially slidable member of the check valve comprises an annular ring having a second flat annular forward valve seat surface and a second frustoconical rearward valve seat surface which effect a mating engagement with the first forward and rearward valve seat surfaces in the valve-opened and valve closed positions respectively.

20. The check valve assembly as claimed in claim 12 wherein at least part of the valve seats of the check valve assembly are covered with an abrasion resistant coating bonded thereto.

21. The check valve assembly as claimed in claim 12 wherein the outside diameter surface of the axially slidable member and the first rearward valve seat are covered with an abrasion-resistant coating of carbide alloy material.

22. The check valve assembly as claimed in claim 7 wherein the disks have at least one notched portion at the outer periphery thereof to receive adhesive therein and retain the disks more securely in the recesses in the valve seats.

23. The check valve assembly as claimed in claim 22 wherein the notched portion is an annular groove extending around the periphery of each of the disks.

24. The check valve assembly as claimed in claim 22 wherein the notched portion is a plurality of grooves extending around the periphery of each of the disks.

25. In an injection molding apparatus having a rotatable and axially translatable feed-screw within a barrel bore and adapted for moving a polymeric material through the barrel from an input end to an exit end and having a check valve assembly mounted forwardly on the feed-screw toward the exit end to govern the amount of a plasticized polymeric material being ejected from the apparatus, a check valve assembly comprising in combination:
(A) a valve body having a conically-shaped forward end and a rearward shank end, the forward end having axially oriented flute passages through the valve seat surface and said shank end having a valve passage portion and a threaded end portion for threaded engagement within an axial bore in the end of the feed-screw~
(B) a valve seat ring mounted on the shank end of the valve body at the juncture of the valve passage portion and the threaded portion and having a forwardly facing valve seat surface; and
(C) an annular valve check ring mounted coaxially about the valve passage portion of the valve body shank end, said check ring having a forward flat annular valve seat surface and rearward frustoconical valve seat surface for alternate seating engagement with the rearward-facing valve seat surface of the conically shaped forward end of the valve body when the valve is in an opened position and with the forward-facing valve seat surface of the valve seat ring when the valve is in a closed position in response to a back-pressure generated by the plasticized material passing through and forwardly of the check valve assembly;

(D) the improvement comprising a plurality of cylindrical recesses extending into at least part of the valve seats, said recesses filled with abrasion resistant disks securely attached therein, said disks effectively reducing frictional wear between relatively co-acting frictional wear surfaces and between the surfaces and the plasticized material as it is moved through the check valve assembly.

26. The check valve assembly as claimed in claim 12 wherein the disks have at least one notched portion at the outer periphery thereof to receive adhesive therein and retain the disks more securely in the recesses in the valve seats.

27. The check valve assembly as claimed in claim 26 wherein the notched portion is an annular groove extending around the periphery of each of the disks.

28. The check valve assembly as claimed in claim 26 wherein the notched portion is a plurality of grooves extending around the periphery of each of the disks.

* * * * *

UNITED STATES PATENT AND TRADEMARK OFFICE
CERTIFICATE OF CORRECTION

| | |
|---|---|
| PATENT NO. | : 7,252,500 B2 |
| APPLICATION NO. | : 11/125689 |
| DATED | : August 7, 2007 |
| INVENTOR(S) | : Joseph R Gill and Daniel W Shetler |

It is certified that error appears in the above-identified patent and that said Letters Patent is hereby corrected as shown below:

On the Title page of the patent, in item (76), change "Daniel W Shelter" to --Daniel W Shetler--.

Signed and Sealed this

Twenty-fourth Day of June, 2008

JON W. DUDAS
*Director of the United States Patent and Trademark Office*